US008476370B2

(12) United States Patent
Backman et al.

(10) Patent No.: US 8,476,370 B2
(45) Date of Patent: Jul. 2, 2013

(54) HIGH DENSITY POLYMER COMPOSITIONS, A METHOD FOR THEIR PREPARATION AND PRESSURE-RESISTANT PIPES MADE THEREFROM

(75) Inventors: Mats Backman, Gothenburg (SE); Carl-Gustaf Ek, Vastra Frolunda (SE); Anneli Pakkanen, Vasterskog (FI); Magnus Palmlof, Vastra Frolunda (SE); Tarja-Tuulikki Turpeinen, Harnari (FI); John Severn, Helsinki (FI)

(73) Assignee: Borealis AG, Vienna (AT)

( * ) Notice: Subject to any disclaimer, the term of this patent is extended or adjusted under 35 U.S.C. 154(b) by 0 days.

(21) Appl. No.: 12/995,992

(22) PCT Filed: May 25, 2009

(86) PCT No.: PCT/EP2009/056307
§ 371 (c)(1),
(2), (4) Date: Mar. 3, 2011

(87) PCT Pub. No.: WO2009/147022
PCT Pub. Date: Dec. 10, 2009

(65) Prior Publication Data
US 2011/0165357 A1 Jul. 7, 2011
US 2011/0274860 A2 Nov. 10, 2011

(30) Foreign Application Priority Data
Jun. 2, 2008 (EP) ..................... 08010017

(51) Int. Cl.
*C08L 23/04* (2006.01)
*C08L 23/08* (2006.01)
*C08F 4/6592* (2006.01)

(52) U.S. Cl.
USPC ............. 525/240; 526/65; 526/160; 526/348; 526/943

(58) Field of Classification Search
USPC .................... 525/240; 526/65, 160, 438, 943, 526/348
See application file for complete search history.

(56) References Cited

U.S. PATENT DOCUMENTS
6,566,450 B2 * 5/2003 Debras et al. ................. 525/191
2012/0000534 A1 * 1/2012 Belloir et al. ..................... 137/1

FOREIGN PATENT DOCUMENTS
| EP | 1909013 A1 | 4/2008 |
| EP | 1909014 A1 | 4/2008 |
| EP | 1927626 A1 | 6/2008 |
| EP | 1927627 A1 | 6/2008 |
| WO | 2004/048468 A1 | 6/2004 |

OTHER PUBLICATIONS

International Preliminary Report on Patentability and Written Opinion. PCT/EP2009/067407, Dec. 8, 2010.
International Search Report from PCT/EP2009/056307 mailed Aug. 25, 2009.

* cited by examiner

*Primary Examiner* — Caixia Lu
(74) *Attorney, Agent, or Firm* — Milbank, Tweed, Hadley & McCloy LLP

(57) ABSTRACT

The present invention deals with polymer compositions suitable for making pipes. The compositions comprise a multimodal copolymer of ethylene and one or more alpha-olefins having from 4 to 10 carbon atoms wherein the multimodal ethylene copolymer has a density of from 937 to 950 kg/m$^3$, a melt index MFR$_5$ of from 0.3 to 3.0 g/10 min, a melt index MFR$_2$ of from 0.1 to 2.0 g/10 min and a shear thinning index SHI$_{2.7/210}$ of from 2 to 30. In addition the multimodal copolymer comprises:

(A) from 30 to 70% by weight, based on the combined amount of components (A) and (B), of a low molecular weight ethylene polymer selected from ethylene homopolymer and a copolymer of ethylene and one or more alpha-olefins having from 4 to 10 carbon atoms and having a weight average molecular weight of from 5000 to 100000 g/mol and a density of from 960 to 977 kg/m$^3$; and (B) from 30 to 70% by weight, based on the combined amount of components (A) and (B), of a high molecular weight copolymer of ethylene and one or more alpha-olefins having from 4 to 10 carbon atoms and having a weight average molecular weight of from 100000 to 1000000 g/mol and a density of from 890 to 929 kg/m$^3$.

15 Claims, 1 Drawing Sheet

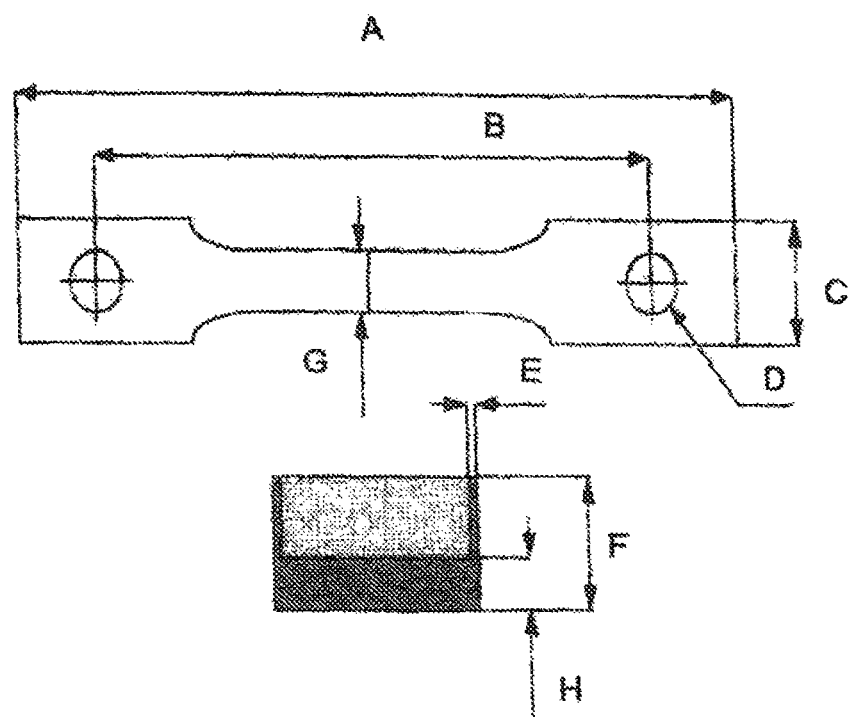

US 8,476,370 B2

HIGH DENSITY POLYMER COMPOSITIONS, A METHOD FOR THEIR PREPARATION AND PRESSURE-RESISTANT PIPES MADE THEREFROM

This application, filed under 35 U.S.C. §371, is based on International Application PCT/EP2009/056307 filed May 25, 2009, which claims priority to European Patent Application No. 08010017.5, filed on Jun. 2, 2008, the disclosures of which are herein incorporated by reference in their entireties.

OBJECTIVE OF THE INVENTION

The present invention is directed for polymer compositions for making pipes. Especially, the present invention is directed for polymer compositions for making flexible pipes having good mechanical properties and which are useful for transporting fluids under pressure. In addition the present invention is directed to pipes made of the polymer compositions and to methods of making them.

TECHNICAL BACKGROUND AND PRIOR ART

Pipes made of polyethylene have become popular in transporting water or gas, for instance in houses and in municipal water distribution. Polyethylenes having a high or medium density are frequently used in such pipes due to their good mechanical properties and ability to withstand pressure. Especially pipes made of multimodal polyethylene having a density of from about 947 to 953 kg/m³ have become increasingly popular. Such pipes and polymer compositions suitable for making them are disclosed, among others, in WO-A-00/01766, WO-A-00/22040, EP-A-739937, EP-A-1141118, EP-A-1041113, EP-A-1330490 and EP-A-1425344. A co-pending European Patent Application No. 06020872.5 discloses flexible pressure-resistant pipes made of bimodal polyethylene and having a density of from 940 to 947 kg/m³.

Such pipes, however, suffer from the disadvantage that the pipes made of HDPE materials are not flexible enough so that they could be wound to a coil which is preferred in certain applications. Flexible pipes have been made from linear low density polyethylene and they are disclosed, among others, in EP-A-1574549. However, such pipes often lack the sufficient mechanical properties that are required from pipes used for transporting water or gas at high pressure.

SUMMARY OF THE INVENTION

The disadvantages of the prior art compositions and pipes are solved by the present polymer compositions and pipes made of them. Especially, the polymer compositions are flexible so that the pipes made of them can easily be bent and coiled. Additionally, the pipes have sufficient mechanical strength that they can be used in pressure pipe applications. Especially the material meets the PE100 qualifications.

As seen from one aspect, the present invention provides polymer compositions polymer composition comprising a multimodal copolymer of ethylene and one or more alpha-olefins having from 4 to 10 carbon atoms wherein the multimodal ethylene copolymer has a density of from 937 to 950 kg/m³, a melt index $MFR_5$ of from 0.3 to 3.0 g/10 min, a melt index $MFR_2$ of from 0.1 to 2.0 g/10 min and a shear thinning index $SHI_{2.7/210}$ of from 2 to 30.

As seen from another aspect, the present invention provides pipes made of the polymer compositions comprising a multimodal copolymer of ethylene and one or more alpha-olefins having from 4 to 10 carbon atoms wherein the multimodal ethylene copolymer has a density of from 937 to 950 kg/m³, a melt index $MFR_5$ of from 0.3 to 3.0 g/10 min, a melt index $MFR_2$ of from 0.1 to 2.0 g/10 min and a shear thinning index $SHI_{2.7/210}$ of from 2 to 30.

As seen from still another aspect, the present invention provides a method for making the polymer compositions wherein the method comprises the steps of:
(i) polymerising, in a first polymerisation step in a first polymerisation zone, in the presence of a single site polymerisation catalyst, ethylene, hydrogen and optionally one or more alpha-olefins having 4 to 10 carbon atoms to form the low molecular weight component (A) having a weight average molecular weight of from 5000 to 100000 g/mol and a density of from 960 to 977 kg/m³;
(ii) polymerising, in a second polymerisation step in a second polymerisation zone, in the presence of a single site polymerisation catalyst, ethylene, one or more alpha-olefins having 4 to 10 carbon atoms and optionally hydrogen to form the high molecular weight component (B) having a weight average molecular weight of from 100000 to 1000000 g/mol and a density of from 890 to 929 kg/m³;
wherein the first polymerisation step and the second polymerisation step may be conducted in any order and the subsequent step is conducted in the presence of the polymer produced in the prior step and the components (A) and (B) are present in the amounts of 30 to 70% and 70 to 30%, respectively, based on the combined amounts of components (A) and (B), and wherein the multimodal ethylene copolymer has a density of from 937 to 950 kg/m³, a melt index $MFR_5$ of from 0.3 to 3.0 g/10 min, a melt index $MFR_2$ of from 0.1 to 2.0 g/10 min and a shear thinning index $SHI_{2.7/210}$ of from 2 to 30.

As seen from a further aspect, the present invention provides the use of the polymer compositions comprising a multimodal copolymer of ethylene and one or more alpha-olefins having from 4 to 10 carbon atoms wherein the multimodal ethylene copolymer has a density of from 937 to 950 kg/m³, a melt index $MFR_5$ of from 0.3 to 3.0 g/10 min, a melt index $MFR_2$ of from 0.1 to 2.0 g/10 min and a shear thinning index $SHI_{2.7/210}$ of from 2 to 30 for making pipes.

DESCRIPTION OF THE FIGURE

FIG. 1 shows the dimensions of the specimen for CTL measurement.

DETAILED DESCRIPTION

Below the invention, its preferred embodiments and its advantages are described more in detail.

Multimodal Ethylene Polymer

The multimodal ethylene copolymer is a copolymer of ethylene and one or more alpha-olefins having from 4 to 10 carbon atoms. It has a density of from 937 to 950 kg/m³, preferably from 937 to 945 kg/m³. Additionally it has a melt index $MFR_5$ of from 0.3 to 3.0 g/10 min, preferably from 0.5 to 2.0 g/10 min and more preferably from 0.6 to 1.5 g/10 min. Further, it has a melt index $MFR_2$ of from 0.1 to 2.0 g/10 min, preferably from 0.2 to 1.0 g/10 min and more preferably from 0.2 to 0.7 g/10 min. Additionally it has a shear thinning index $SHI_{2.7/210}$ of from 2 to 30, preferably from 3 to 20 and more preferably from 3 to 15.

The multimodal ethylene copolymer has preferably weight average molecular weight of from 80000 to 250000 g/mol, more preferably from 100000 to 250000 g/mol and in particular from 120000 to 220000 g/mol. Additionally, it preferably has a number average molecular weight of from 5000 to 40000 g/mol and more preferably from 8000 to 25000 g/mol.

It furthermore preferably has a ratio of the weight average molecular weight to the number average molecular weight, Mw/Mn, of from 5 to 20 and more preferably from 8 to 20.

Preferably the multimodal ethylene copolymer comprises a low molecular weight ethylene polymer component (A) and a high molecular weight ethylene copolymer component (B). Especially, the composition preferably contains from 30 to 70% the low molecular weight polymer (A) and more preferably from 35 to 50%. In addition, the composition preferably contains from 70 to 30% by weight of the copolymer (B) and more preferably from 65 to 50%. The percentage figures are based on the combined weight of components (A) and (B). The components (A) and (B) are explained more in detail below.

The low molecular weight polymer component (A) is an ethylene homopolymer or a copolymer of ethylene and one or more alpha-olefins having from 4 to 10 carbon atoms. It preferably has a weight average molecular weight Mw of from 5000 to 100000 g/mol, more preferably from 10000 to 100000 g/mol, especially preferably from 15000 to 80000 g/mol and in particular from 15000 to 50000 g/mol. Preferably it has a melt index $MFR_2$ of from 20 to 1500 g/10 min. Moreover, it preferably has a narrow molecular weight distribution having a ratio of the weight average molecular weight to the number average molecular weight of from 2 to 5.0. Furthermore, it preferably has a density of from 960 to 977 $kg/m^3$. Especially preferably the low molecular weight ethylene polymer (A) is an ethylene homopolymer.

The high molecular weight polymer component (B) is a copolymer of ethylene and one or more alpha-olefins having from 4 to 10 carbon atoms. It preferably has a weight average molecular weight Mw of from 100000 to 1000000 g/mol, more preferably from 150000 to 500000 g/mol. Preferably it has a melt index $MFR_2$ of from 0.001 to 0.3 g/10 min. Moreover, it preferably has a narrow molecular weight distribution having a ratio of the weight average molecular weight to the number average molecular weight of from 2 to 3.5. Furthermore, it preferably has a density of from 890 to 929 $kg/m^3$, more preferably from 900 to 925 $kg/m^3$, and in particular from 900 to 922 $kg/m^3$.

By ethylene homopolymer is meant a polymer which substantially consists of ethylene units. As the process streams may have small amount of other polymeriseable species as impurities the homopolymer may contain a small amount of units other than ethylene. The content of such units should be lower than 0.2% by mole, preferably less than 0.1% by mole.

By copolymer of ethylene and one or more alpha-olefins having from 4 to 10 carbon atoms is meant a copolymer which has a majority of ethylene units and substantially consists of units derived from ethylene and alpha-olefins having from 4 to 10 carbon atoms. As the process streams may have small amount of other polymeriseable species as impurities the copolymer may contain a small amount of units other than ethylene and alpha-olefins having from 4 to 10 carbon atoms. The content of such units should be lower than 0.2% by mole, preferably less than 0.1% by mole.

The low molecular weight polymer component (A) and the high molecular weight polymer component (B) can also be blends of two or more different polymer fractions provided that each fraction, as well as the blend, meets the requirements given above for the specific component.

The multimodal ethylene copolymer may also contain minor amount of other polymer, such as prepolymer. The amount of such polymers should not exceed 5%, preferably not 2% by weight of the multimodal ethylene copolymer.

Polymerisation Process

The multimodal ethylene copolymer is typically produced in a multistage polymerisation process in the presence of a single site catalyst.

In the multistage polymerisation process ethylene and alpha-olefins having from 4 to 10 carbon atoms are polymerised in a process comprising at least two polymerisation stages. Each polymerisation stage may be conducted in a separate reactor but they may also be conducted in at least two distinct polymerisation zones in one reactor. Preferably, the multistage polymerisation process is conducted in at least two cascaded polymerisation stages.

Catalyst

The polymerisation is typically conducted in the presence of a single site polymerisation catalyst. Preferably the single site catalyst is a metallocene catalyst. Such catalysts comprise a transition metal compound which contains a cyclopentadienyl, indenyl or fluorenyl ligand. Preferably the catalyst contains two cyclopentadienyl, indenyl or fluorenyl ligands, which may be bridged by a group preferably containing silicon and/or carbon atom(s). Further, the ligands may have substituents, such as alkyl groups, aryl groups, arylalkyl groups, alkylaryl groups, silyl groups, siloxy groups, alkoxy groups and like. Suitable metallocene compounds are known in the art and are disclosed, among others, in WO-A-97/28170, WO-A-98/32776, WO-A-99/61489, WO-A-03/010208, WO-A-03/051934, WO-A-03/051514, WO-A-2004/085499, EP-A-1752462 and EP-A-1739103.

The metallocene compound must be capable of producing polyethylene having sufficiently high molecular weight. Especially it has been found that metallocene compounds having hafnium as the transition metal atom or metallocene compounds comprising an indenyl or tetrahydroindenyl type ligand often have the desired characteristics.

One example of suitable metallocene compounds is the group of metallocene compounds having zirconium, titanium or hafnium as the transition metal and one or more ligands having indenyl structure bearing a siloxy substituent, such as [ethylenebis(3,7-di(tri-isopropylsiloxy)inden-1-yl)]zirconium dichloride (both rac and meso), [ethylenebis(4,7-di(tri-isopropylsiloxy)inden-1-yl)]zirconium dichloride (both rac and meso), [ethylenebis(5-tert-butyldimethylsiloxy)inden-1-yl)]zirconium dichloride (both rac and meso), bis(5-tert-butyldimethylsiloxy)inden-1-yl)zirconium dichloride, [dimethylsilylenenebis(5-tert-butyldimethylsiloxy)inden-1-yl)] zirconium dichloride (both rac and meso), (N-tert-butylamido)(dimethyl)($\eta^5$-inden-4-yloxy)silanetitanium dichloride and [ethylenebis(2-(tert-butyldimethylsiloxy)inden-1-yl)]zirconium dichloride (both rac and meso).

Another example is the group of metallocene compounds having hafnium as the transition metal atom and bearing a cyclopentadienyl type ligand, such as bis(n-butylcyclopentadienyl)hafnium dichloride, bis(n-butylcyclopentadienyl)dibenzylhafnium, dimethylsilylenenebis(n-butylcyclopentadienyl)hafnium dichloride (both rac and meso) and bis[1,2,4-tri(ethyl)cyclopentadienyl]hafnium dichloride.

Still another example is the group of metallocene compounds bearing a tetrahydroindenyl ligand such as bis(4,5,6,7-tetrahydroindenyl)zirconium dichloride, bis(4,5,6,7-tetrahydroindenyl)hafnium dichloride, ethylenebis(4,5,6,7-tetrahydroindenyl)zirconium dichloride, dimethylsilylenebis(4,5,6,7-tetrahydroindenyl)zirconium dichloride.

The single site catalyst typically also comprises an activator. Generally used activators are alumoxane compounds, such as methylalumoxane (MAO), tetraisobutylalumoxane (TIBAO) or hexaisobutylalumoxane (HIBAO). Also boron activators, such as those disclosed in US-A-2007/049711 may be used. The activators mentioned above may be used alone or they may be combined with, for instance, aluminium alkyls, such as triethylaluminium or tri-isobutylaluminium.

The catalyst is preferably supported. The support may be any particulate support, including inorganic oxide support, such as silica, alumina or titania, or polymeric support, such as polymer comprising styrene or divinylbenzene.

The catalyst may also comprise the metallocene compound on solidified alumoxane, or it may be a solid catalyst prepared according to emulsion solidification technology. Such catalysts are disclosed, among others, in EP-A-1539775 or WO-A-03/051934.

Polymerisation

The multimodal ethylene copolymer may be produced in any suitable polymerisation process known in the art. Into the polymerisation zone is also introduced ethylene, optionally an inert diluent, and optionally hydrogen and/or comonomer. The low molecular weight ethylene polymer component is produced in a first polymerisation zone and the high molecular weight ethylene copolymer component is produced in a second polymerisation zone. The first polymerisation zone and the second polymerization zone may be connected in any order, i.e. the first polymerisation zone may precede the second polymerisation zone, or the second polymerisation zone may precede the first polymerisation zone or, alternatively, polymerisation zones may be connected in parallel. However, it is preferred to operate the polymerisation zones in cascaded mode. The polymerisation zones may operate in slurry, solution, or gas phase conditions or their combinations. Suitable reactor configurations are disclosed, among others, in WO-A-92/12182, EP-A-369436, EP-A-503791, EP-A-881237 and WO-A-96/18662. Examples of processes where the polymerisation zones are arranged within one reactor system are disclosed in WO-A-99/03902, EP-A-782587 and EP-A-1633466.

It is often preferred to remove the reactants of the preceding polymerisation stage from the polymer before introducing it into the subsequent polymerisation stage. This is preferably done when transferring the polymer from one polymerisation stage to another. Suitable methods are disclosed, among others, In EP-A-1415999 and WO-A-00/26258.

The polymerisation in the polymerisation zone may be conducted in slurry. Then the polymer particles formed in the polymerisation, together with the catalyst fragmented and dispersed within the particles, are suspended in the fluid hydrocarbon. The slurry is agitated to enable the transfer of reactants from the fluid into the particles.

The polymerisation usually takes place in an inert diluent, typically a hydrocarbon diluent such as methane, ethane, propane, n-butane, isobutane, pentanes, hexanes, heptanes, octanes etc., or their mixtures. Preferably the diluent is a low-boiling hydrocarbon having from 1 to 4 carbon atoms or a mixture of such hydrocarbons. An especially preferred diluent is propane, possibly containing minor amount of methane, ethane and/or butane.

The ethylene content in the fluid phase of the slurry may be from 2 to about 50% by mole, preferably from about 3 to about 20% by mole and in particular from about 5 to about 15% by mole. The benefit of having a high ethylene concentration is that the productivity of the catalyst is increased but the drawback is that more ethylene then needs to be recycled than if the concentration was lower.

The temperature in the slurry polymerisation is typically from 50 to 115° C., preferably from 60 to 110° C. and in particular from 70 to 100° C. The pressure is from 1 to 150 bar, preferably from 10 to 100 bar.

The slurry polymerisation may be conducted in any known reactor used for slurry polymerisation. Such reactors include a continuous stirred tank reactor and a loop reactor. It is especially preferred to conduct the polymerisation in loop reactor. In such reactors the slurry is circulated with a high velocity along a dosed pipe by using a circulation pump. Loop reactors are generally known in the art and examples are given, for instance, in U.S. Pat. Nos. 4,582,816, 3,405,109, 3,324,093, EP-A-479186 and U.S. Pat. No. 5,391,654.

It is sometimes advantageous to conduct the slurry polymerisation above the critical temperature and pressure of the fluid mixture. Such operation is described in U.S. Pat. No. 5,391,654. In such operation the temperature is typically from 85 to 110° C., preferably from 90 to 105° C. and the pressure is from 40 to 150 bar, preferably from 50 to 100 bar.

The slurry may be withdrawn from the reactor either continuously or intermittently. A preferred way of intermittent withdrawal is the use of settling legs where slurry is allowed to concentrate before withdrawing a batch of the concentrated slurry from the reactor. The use of settling legs is disclosed, among others, in U.S. Pat. Nos. 3,374,211, 3,242,150 and EP-A-1310295. Continuous withdrawal is disclosed, among others, in EP-A-891990, EP-A-1415999, EP-A-1591460 and WO-A-2007/025640. The continuous withdrawal is advantageously combined with a suitable concentration method, as disclosed in EP-A-1310295 and EP-A-1581460.

If the low molecular weight ethylene polymer is produced in slurry polymerisation stage then hydrogen is added to the slurry reactor so that the molar ratio of hydrogen to ethylene in the reaction phase is from 0.1 to 1.0 mol/kmol, and preferably from 0.2 to 0.7 mol/kmol. Comonomer may then also be introduced into the slurry polymerisation stage so that the molar ratio of comonomer to ethylene in the reaction phase does not exceed 150 mol/kmol, and preferably not 50 mol/kmol. Especially preferably no comonomer is introduced into the slurry polymerisation stage.

If the high molecular weight ethylene polymer is produced in slurry polymerisation stage then hydrogen is added to the slurry reactor so that the molar ratio of hydrogen to ethylene in the reaction phase is at most 0.1 mol/kmol, preferably from 0.01 to 0.07 mol/kmol. Especially preferably, no hydrogen is introduced into the slurry polymerisation stage. Comonomer is introduced into the slurry polymerisation stage so that the molar ratio of comonomer to ethylene is from 50 to 200 mol/kmol, preferably from 70 to 120 mol/kmol.

The polymerisation may also be conducted in gas phase. In a fluidised bed gas phase reactor an olefin is polymerised in the presence of a polymerisation catalyst in an upwards moving gas stream. The reactor typically contains a fluidised bed comprising the growing polymer particles containing the active catalyst located above a fluidisation grid.

The polymer bed is fluidised with the help of the fluidisation gas comprising the olefin monomer, eventual comonomer(s), eventual chain growth controllers or chain transfer agents, such as hydrogen, and eventual inter gas. The fluidisation gas is introduced into an inlet chamber at the bottom of the reactor. To make sure that the gas flow is uniformly distributed over the cross-sectional surface area of the inlet chamber the inlet pipe may be equipped with a flow dividing element as known in the art, e.g. U.S. Pat. No. 4,933,149 and EP-A-684871.

From the inlet chamber the gas flow is passed upwards through a fluidisation grid into the fluidised bed. The purpose of the fluidisation grid is to divide the gas flow evenly through the cross-sectional area of the bed. Sometimes the fluidisation grid may be arranged to establish a gas stream to sweep along the reactor walls, as disclosed in WO-A-2005/087361. Other types of fluidisation grids are disclosed, among others, in U.S. Pat. No. 4,578,879, E-A-600414 and EP-A-721798. An overview is given in Geldart and Bayens: The Design of Distributors for Gas-fluidized Beds, Powder Technology, Vol. 42, 1985.

The fluidisation gas passes through the fluidised bed. The superficial velocity of the fluidisation gas must be higher that minimum fluidisation velocity of the particles contained in the fluidised bed, as otherwise no fluidisation would occur. On the other hand, the velocity of the gas should be lower than the onset velocity of pneumatic transport, as otherwise the whole bed would be entrained with the fluidisation gas. The minimum fluidisation velocity and the onset velocity of pneumatic transport can be calculated when the particle characteristics are know by using common engineering practise. An overview is given, among others in Geldart: Gas Fluidization Technology, J. Wiley & Sons, 1986.

When the fluidisation gas is contacted with the bed containing the active catalyst the reactive components of the gas, such as monomers and chain transfer agents, react in the presence of the catalyst to produce the polymer product. At the same time the gas is heated by the reaction heat.

The unreacted fluidisation gas is removed from the top of the reactor and cooled in a heat exchanger to remove the heat of reaction. The gas is cooled to a temperature which is lower than that of the bed to prevent the bed from heating because of the reaction. It is possible to cool the gas to a temperature where a part of it condenses. When the liquid droplets enter the reaction zone they are vaporised. The vaporisation heat then contributes to the removal of the reaction heat. This kind of operation is called condensed mode and variations of it are disclosed, among others, in WO-A-2007/025640, U.S. Pat. No. 4,543,399, EP-A-699213 and WO-A-94/25495. It is also possible to add condensing agents into the recycle gas stream, as disclosed in EP-A-696293. The condensing agents are non-polymerisable components, such as n-pentane, isopentane, n-butane or isobutene, which are at least partially condensed in the cooler.

The gas is then compressed and recycled into the inlet chamber of the reactor. Prior to the entry into the reactor fresh reactants are introduced into the fluidisation gas stream to compensate for the losses caused by the reaction and product withdrawal. It is generally known to analyse the composition of the fluidisation gas and introduce the gas components to keep the composition constant. The actual composition is determined by the desired properties of the product and the catalyst used in the polymerisation.

The catalyst may be introduced into the reactor in various ways, either continuously or intermittently. Among others, WO-A-01/05845 and EP-A-499759 disclose such methods. Where the gas phase reactor is a part of a reactor cascade the catalyst is usually dispersed within the polymer particles from the preceding polymerisation stage. The polymer particles may be introduced into the gas phase reactor as disclosed in EP-A-1415999 and WO-A-00/26258.

The polymeric product may be withdrawn from the gas phase reactor either continuously or intermittently. Combinations of these methods may also be used. Continuous withdrawal is disclosed, among others, in WO-A-00/29452. Intermittent withdrawal is disclosed, among others, in U.S. Pat. No. 4,621,952, EP-A-188125, EP-A-250169 and EP-A-579426.

The top part of the gas phase reactor may include a so called disengagement zone. In such a zone the diameter of the reactor is increased to reduce the gas velocity and allow the particles that are carried from the bed with the fluidisation gas to settle back to the bed.

The bed level may be observed by different techniques known in the art. For instance, the pressure difference between the bottom of the reactor and a specific height of the bed may be recorded over the whole length of the reactor and the bed level may be calculated based on the pressure difference values. Such a calculation yields a time-averaged level. It is also possible to use ultrasonic sensors or radioactive sensors. With these methods instantaneous levels may be obtained, which of course may then be averaged over time to obtain time-averaged bed level.

Also antistatic agent(s) may be introduced into the gas phase reactor if needed. Suitable antistatic agents and methods to use them are disclosed, among others, in U.S. Pat. Nos. 5,026,795, 4,803,251, 4,532,311, 4,855,370 and EP-A-560035. They are usually polar compounds and include, among others, water, ketones, aldehydes and alcohols.

The reactor may also include a mechanical agitator to further facilitate mixing within the fluidised bed. An example of suitable agitator design is given in EP-A-707513.

If the low molecular weight ethylene polymer is produced in gas phase polymerisation stage then hydrogen is added to the gas phase reactor so that the molar ratio of hydrogen to ethylene is from 0.5 to 1.5 mol/kmol, and preferably from 0.7 to 1.3 mol/kmol. Comonomer may then also be introduced into the gas phase polymerisation stage so that the molar ratio of comonomer to ethylene does not exceed 20 mol/kmol, and preferably not 15 mol/kmol. Especially preferably no comonomer is introduced into the gas phase polymerisation stage.

If the high molecular weight ethylene polymer is produced in gas phase polymerisation stage then hydrogen is added to the gas phase reactor so that the molar ratio of hydrogen to ethylene is at most 0.4 mol/kmol, preferably at most 0.3 mol/kmol. Especially preferably, no hydrogen is introduced into the gas phase polymerisation stage. Comonomer is introduced into the gas phase polymerisation stage so that the molar ratio of comonomer to ethylene is from 5 to 50 mol/kmol.

Polymer Composition

In addition to the multimodal ethylene copolymer the polymer composition comprises additives, fillers and adjuvants known in the art. It may also contain additional polymers, such as carrier polymers of the additive masterbatches. Preferably the polymer composition comprises at least 50% by weight of the multimodal ethylene copolymer, preferably from 80 to 100% by weight and more preferably from 85 to 100% by weight, based on the total weight of the composition.

Suitable antioxidants and stabilizers are, for instance, sterically hindered phenols, phosphates or phosphonites, sulphur containing antioxidants, alkyl radical scavengers, aromatic amines, hindered amine stabilizers and the blends containing compounds from two or more of the above-mentioned groups.

Examples of sterically hindered phenols are, among others, 2,6-di-tert-butyl-4-methyl phenol (sold, e.g., by Degussa under a trade name of Ionol CP), pentaerythrityl-tetrakis(3-(3',5'-di-tert.butyl-4-hydroxyphenyl)-propionate (sold, e.g., by Ciba Specialty Chemicals under the trade name of Irganox 1010) octadecyl-3-3(3'5'-di-tert-butyl-4'-hydroxyphenyl) propionate (sold, e.g., by Ciba Specialty Chemicals under the trade name of Irganox 1076) and 2,5,7,8-tetramethyl-2(4',8',12'-trimethyltridecyl)chroman-6-ol (sold, e.g., by BASF under the trade name of Alpha-Tocopherol).

Examples of phosphates and phosphonites are tris (2,4-di-t-butylphenyl) phosphite (sold, e.g., by Ciba Specialty Chemicals under the trade name of Irgafos 168), tetrakis-(2, 4-di-t-butylphenyl)-4,4'-biphenylen-di-phosphonite (sold, e.g., by Ciba Specialty Chemicals under the trade name of Irgafos P-EPQ) and tris-(nonylphenyl)phosphate (sold, e.g., by Dover Chemical under the trade name of Doverphos HiPure 4)

Examples of sulphur-containing antioxidants are dilaurylthiodipropionate (sold, e.g., by Ciba Specialty Chemicals under the trade name of Irganox PS 800), and distearylthiodipropionate (sold, e.g., by Chemtura under the trade name of Lowinox DSTDB).

Examples of nitrogen-containing antioxidants are 4,4'-bis (1,1'-dimethylbenzyl)diphenylamine (sold, e.g., by Chemtura under the trade name of Naugard 445), polymer of 2,2,4-trimethyl-1,2-dihydroquinoline (sold, e.g., by Chemtura under the trade name of Naugard EL-17), p-(p-toluene-sulfonylamido)-diphenylamine (sold, e.g., by Chemtura under the trade name of Naugard SA) and N,N'-diphenyl-p-phenylene-diamine (sold, e.g., by Chemtura under the trade name of Naugard J).

Commercially available blends of antioxidants and process stabilizers are also available, such as Irganox B225, Irganox B215 and Irganox B561 marketed by Ciba-Geigy.

Suitable acid scavengers are, for instance, metal stearates, such as calcium stearate and zinc stearate. They are used in amounts generally known in the art, typically from 500 ppm to 10000 ppm and preferably from 500 to 5000 ppm.

Carbon black is a generally used pigment, which also acts as an UV-screener. Typically carbon black is used in an amount of from 0.5 to 5% by weight, preferably from 1.5 to 3.0% by weight. Preferably the carbon black is added as a masterbatch where it is premixed with a polymer, preferably high density polyethylene (HDPE), in a specific amount. Suitable masterbatches are, among others, HD4394, sold by Cabot Corporation, and PPM1805 by Poly Plast Muller. Also titanium oxide may be used as an UV-screener.

The composition comprising the multimodal ethylene copolymer has preferably high impact strength. Thus, it preferably has Charpy impact strength at 0° C. of at least 20 kJ/m$^2$, more preferably of at least 30 kJ/m$^2$ and in particular of at least 35 kJ/m$^2$, or even of at least 40 kJ/m$^2$. Typical values may be from about 40 kJ/m$^2$ to about 70 kJ/m$^2$.

Pipe and Pipe Manufacture

Pipes according to the present invention are produced according to the methods known in the art from the polymer composition as described above. Thus, according to one preferred method the polymer composition is extruded through an annular die to a desired internal diameter, after which the polymer composition is cooled.

The pipe extruder preferably operates at a relatively low temperature and therefore excessive heat build-up should be avoided. Extruders having a high length to diameter ratio L/D more than 15, preferably of at least 20 and in particular of at least 25 are preferred. The modern extruders typically have an L/D ratio of from about 30 to 35.

The polymer melt is extruded through an annular die, which may be arranged either as end-fed or side-fed configuration. The side-fed dies are often mounted with their axis parallel to that of the extruder, requiring a right-angle turn in the connection to the extruder. The advantage of side-fed dies is that the mandrel can be extended through the die and this allows, for instance, easy access for cooling water piping to the mandrel.

After the plastic melt leaves the die it is calibrated to the correct diameter. In one method the extrudate is directed into a metal tube (calibration sleeve). The inside of the extrudate is pressurised so that the plastic is pressed against the wall of the tube. The tube is coded by using a jacket or by passing cold water over it.

According to another method a water-cooled extension is attached to the end of the die mandrel. The extension is thermally insulated from the die mandrel and is cooled by water circulated through the die mandrel. The extrudate is drawn over the mandrel which determines the shape of the pipe and holds it in shape during cooling. Cold water is flowed over the outside pipe surface for cooling.

According to still another method the extrudate leaving the die is directed into a tube having perforated section in the centre. A slight vacuum is drawn through the perforation to hold the pipe hold the pipe against the walls of the sizing chamber.

After the sizing the pipe is cooled, typically in a water bath having a length of about 5 metres or more.

The pipes according to the present invention fulfil the requirements of PE100 standard as defined in EN 12201 and EN 1555, alternatively ISO 4427 and ISO 4437, evaluated according to ISO 9080.

EXAMPLES

Methods

Melt Index

The melt flow rate (MFR) is determined according to ISO 1133 and is indicated in g/10 min. The MFR is an indication of the melt viscosity of the polymer. The MFR is determined at 190° C. for PE. The load under which the melt flow rate is determined is usually indicated as a subscript, for instance MFR$_2$ is measured under 2.16 kg load (condition D), MFR$_5$ is measured under 5 kg load (condition T) or MFR$_{21}$ is measured under 21.6 kg load (condition G).

The quantity FRR (flow rate ratio) is an indication of molecular weight distribution and denotes the ratio of flow rates at different loads. Thus, FRR$_{21/2}$ denotes the value of MFR$_{21}$/MFR$_2$.

Density

Density of the polymer was measured according to ISO 1183/1872-2B.

For the purpose of this invention the density of the blend can be calculated from the densities of the components according to:

$$\rho_b = \sum_i w_i \cdot \rho_i$$

where $\rho_b$ is the density of the blend, $w_i$ is the weight fraction of component "i" in the blend and $\rho_i$ is the density of the component T.

Molecular Weight

Mw, Mn and MWD are measured by Gel Permeation Chromatography (GPC) according to the following method:

The weight average molecular weight Mw and the molecular weight distribution (MWD=Mw/Mn wherein Mn is the number average molecular weight and Mw is the weight average molecular weight) is measured according to ISO 16014-4:2003 and ASTM D 6474-99. A Waters GPCV2000 instrument, equipped with refractive index detector and online viscosimeter was used with 2×GMHXL-HT and 1×G7000HXL-HT TSK-gel columns from Tosoh Bioscience and 1,2,4-trichlorobenzene (TCB, stabilized with 250 mg/L 2,6-Di tert-butyl-4-methyl-phenol) as solvent at 140° C. and at a constant flow rate of 1 mL/min. 209.5 μL of sample solution were injected per analysis. The column set was calibrated using universal calibration (according to ISO 16014-2:2003) with at least 15 narrow MWD polystyrene (PS) standards in the range of 1 kg/mol to 12 000 kg/mol. Mark Houwink constants were used as given in ASTM D 6474-99. All samples were prepared by dissolving 0.5-4.0 mg of polymer in 4 mL (at 140° C.) of stabilized TCB (same as mobile phase) and keeping for max. 3 hours at a maximum temperature of 160° C. with continuous gentle shaking prior sampling in into the GPC instrument.

As it is known in the art, the weight average molecular weight of a blend can be calculated if the molecular weights of its components are known according to:

$$Mw_b = \sum_i w_i \cdot Mw_i$$

where
Mw$_b$ is the weight average molecular weight of the blend,
w$_i$ is the weight fraction of component "i" in the blend and
Mw$_i$ is the weight average molecular weight of the component "i".

The number average molecular weight can be calculated using the mixing rule:

$$\frac{1}{Mn_b} = \sum_i \frac{w_i}{Mn_i}$$

where
Mn$_b$ is the number average molecular weight of the blend,
w$_i$ is the weight fraction of component "i" in the blend and
Mn$_i$ is the number average molecular weight of the component "i".

Comonomer Content

Comonomer content was determined in a known manner based on Fourier transform infrared spectroscopy (FTIR) determination using Nicolet Magna 550 IR spectrometer together with Nicolet Omnic FTIR software.

Films having a thickness of about 220 to 250 μm were compression moulded from the samples. Similar films were made from calibration samples having a known content of the comonomer. The thicknesses were measured from at least five points of the film. The films were then rubbed with sandpaper to eliminate reflections. The films were not touched by plain hand to avoid contamination. For each sample and calibration sample at least two films were prepared. The films were pressed from pellets by using a Graceby Specac film press at 150° C. using 3+2 minutes preheating time, 1 minute compression time and 4 to 5 minutes cooling time. For very high molecular weight samples the preheating time may be prolonged or the temperature increased.

The comonomer content was determined from the absorbance at the wave number of approximately 1378 cm$^{-1}$. The comonomer used in the calibration samples was the same as the comonomer present in the samples. The analysis was performed by using the resolution of 2 cm$^{-1}$, wave number span of from 4000 to 400 cm$^{-1}$ and the number of sweeps of 128. At least two spectra were run from each film.

The comonomer content was determined from the spectrum from the wave number range of from 1430 to 1100 cm$^{-1}$. The absorbance is measured as the height of the peak by selecting the so-called short or long base line or both. The short base line is drawn in about 1410-1320 cm$^{-1}$ through the minimum points and the long base line about between 1410 and 1220 cm$^{-1}$. Calibrations need to be done specifically for each base fine type. Also, the comonomer content of the unknown sample needs to be within the range of the comonomer contents of the calibration samples.

From the calibration samples a straight line is obtained as follows:

$$C_i = k \cdot \frac{A_{1378,i}}{s_i} + b$$

where
$C_i$ is the comonomer content of the calibration sample i
$A_{1378,i}$ is the absorbance at about 1378 cm$^{-1}$ of sample
$s_i$ is the thickness of the film made of calibration sample i
k is the slope of the calibration line (obtained by regression analysis), and
b is the intercept of the calibration line (obtained by regression analysis).

By using the thus obtained parameters k and b the comonomer content of the samples were obtained from $$C_x = k \cdot \frac{A_{1378,x}}{s_x} + b$$

where
$C_x$ is the comonomer content of the unknown sample
$A_{1378,x}$ is the absorbance at about 1378 cm$^{-1}$ of the unknown sample
$s_x$ is the thickness of the film made of the unknown sample
k is the slope of the calibration line obtained from the calibration samples as above
b is the intercept of the calibration line obtained from the calibration samples.

Rheology

Rheological parameters such as Shear Thinning Index SHI and Viscosity are determined by using a rheometer, preferably an Anton Pear Physica MCR 300 Rheometer on compression moulded samples under nitrogen atmosphere at 190° C. using 25 mm diameter plates and plate and plate geometry with a 1.8 mm gap according to ATSM 1440-95. The oscilatory shear experiments were done within the linear viscosity range of strain at frequencies from 0.05 to 300 rad/s (ISO 6721-1). Five measurement points per decade were made. The method is described in detail in WO 00/22040.

The values of storage modulus (G'), loss modulus (G") complex modulus (G*) and complex viscosity (η*) were obtained as a function of frequency (ω). η$_{100}$ is used as abbreviation for the complex viscosity at the frequency of 100 rad/s.

Shear thinning index (SHI), which correlates with MWD and is independent of Mw, was calculated according to Heino ("Rheological characterization of polyethylene fractions" Heino, E. L., Lehtinen, A., Tanner J., Seppälä, J., Neste Oy, Porvoo, Finland, Theor. Appl. Rheol., Proc. Int. Congr. Rheol, 11th (1992), 1, 360-362, and "The influence of molecular structure on some rheological properties of polyethylene", Heino, E. L., Borealis Polymers Oy, Porvoo, Finland, Annual Transactions of the Nordic Rheology Society, 1995).

SHI value is obtained by calculating the complex viscosities at given values of complex modulus and calculating the ratio of the two viscosities. For example, using the values of complex modulus of 2.7 kPa and 210 kPa, then η*(2.7 kPa) and η*(210 kPa) are obtained at a constant value of complex modulus of 2.7 kPa and 210 kPa, respectively. The shear thinning index $SHI_{2.7/210}$ is then defined as the ratio of the two viscosities η*(2.7 kPa) and η*(210 kPa), i.e. η(2.7)/η(210).

It is not always practical to measure the complex viscosity at a low value of the frequency directly. The value can be extrapolated by conducting the measurements down to the frequency of 0.126 rad/s, drawing the plot of complex viscosity vs. frequency in a logarithmic scale, drawing a best-fitting line through the five points corresponding to the lowest values of frequency and reading the viscosity value from this line.

Charm Impact Strength

Charpy impact strength was determined according to ISO 179-1:2000 according to conditions 1 eA on V-notched samples at 0° C.

The test specimens were compression moulded samples of multipurpose type B (ISO 3167) with a thickness of 4 mm. Average cooling rate was 15 K/min (ISO 1872-2).

CTL

CTL was determined by using a method similar to ISO 6252:1992 as follows.

The samples are prepared by pressing a plaque at 180° C. and 10 MPa pressure with a total length of 125 to 130 mm and a width at its ends of 21±0.5 mm. The plaque then is milled into the correct dimensions in a fixture on two of the sides with a centre distance of both holders of 90 mm and a hole diameter of 10 mm. The central part of the plaque has a parallel length of 30±0.5 mm, a width of 9±0.5 mm, and a thickness of 6±0.5 mm.

A front notch of 2.5 mm depth is then cut into the sample with a razor blade fitted into a notching machine (PENT-NOTCHER, Norman Brown engineering), the notching speed is 0.2 mm/min. On the two remaining sides side grooves of 0.8 mm are cut which should be coplanar with the notch. After making the notches, the sample is conditioned in 23±1° C. and 50% relative humidity for at least 48 h. The samples are then mounted into a test chamber in which the active solution (10% solution of IGEPAL CO-730 in deionised water, chemical substance: 2-(4-nonyl-phenoxy)ethanol) is kept at 60° C. temperature. The samples are loaded with a dead weight corresponding to an initial stress of about 5 MPa and at the moment of breakage an automatic timer is shut off. The average of at least two measurements is reported.

The sample and the notch applied to the sample are shown in FIG. 1, in which:
A: total length of the specimen 125 to 130 mm
B: distance between the centre points of the holders 90 mm
C: width of the specimen at the end 21±0.5 mm
D: hole diameter 10 mm
E: side grooves 0.8 mm
F: thickness of plaque 6±0.2 mm
G: width of narrow parallel part 9±0.5 mm
H: main notch 2.5±0.02 mm The length of the narrow section of the specimen was 30±0.5 mm.

Preparation Example 1

Preparation of the Catalyst

Complex Preparation:

The catalyst complex used in the polymerisation example was bis(n-butylcyclopentadienyl) hafnium dibenzyl, $(n\text{-BuCp})_2\text{Hf}(\text{CH}_2\text{Ph})_2$, and it was prepared according to "Catalyst Preparation Example 2" of WO 2005/002744, starting from bis(n-butylcyclopentadienyl) hafnium dichloride (supplied by Witco).

Activated Catalyst System:

The catalyst was prepared according to Example 4 of WO-A-03/051934, except that 98.4 mg of bis(n-butyl cyclopentadienyl)hafnium dibenzyl prepared as above was used as the metallocene compound instead of 80.3 mg bis(n-butyl cyclopentadienyl)hafnium dichloride.

Polymerisation

A 2 dm³ Büchi autoclave reactor was heated to 60° C. and purged first with dry nitrogen and then with ethylene. 440 ml of propane, from which moisture and oxygen had been removed by passing it through catalyst beds containing molecular sieves copper oxide catalyst, was introduced into the reactor. Then about 115 mg of polymerisation catalyst prepared according to the description above was introduced into the reactor. The reaction was started by feeding ethylene and 10 g/h of 1-hexene into the reactor. The pressure in the reactor was set to 24.5 bar so that the partial pressure of ethylene was 4 bar. The pressure was maintained constant by feeding ethylene and 1-hexene to compensate for the amounts consumed in polymerisation. No hydrogen was fed. The polymerisation was allowed to proceed for 151 minutes after which the hydrocarbons were vented and the polymer recovered, dried and analysed.

Preparation Example 2

Preparation of the Catalyst

Metallocene Complex Preparation:

The catalyst complex used in the polymerisation examples was bis(n-butylcyclopentadienyl) hafnium dibenzyl, $(n\text{-BuCp})_2\text{Hf}(\text{CH}_2\text{Ph})_2$, and it was prepared according to "Catalyst Preparation Example 2" of WO2005/002744, starting from bis(n-butylcyclopentadienyl) hafnium dichloride (supplied by Witco).

The catalyst preparation was made in a 160 L batch reactor into which a metallocene complex solution was added. Mixing speed was 40 rpm during reaction and 20 rpm during drying. Reactor was carefully flushed with toluene prior to reaction and purged with nitrogen after silica addition Activated Catalyst System 10.0 kg activated silica (commercial silica carrier, XPO2485A, having an average particle size 20 μm, supplier. Grace) were first slurried into 21.7 kg dry toluene at room temperature. Then the silica slurry was added to 14.8 kg of 30 wt % methylalumoxane in toluene (MAO, supplied by Albemarle) during 3 hours. Afterwards the MAO/silica mixture was heated to 79° C. for 6 hours and then cooled down to room temperature again.

The resulting solution was reacted with 0.33 kg of $(n\text{-BuCp})_2\text{Hf}(\text{CH}_2\text{Ph})_2$ in toluene (67.9 wt %) for 8 hours at room temperature.

The catalyst was dried under nitrogen purge for 5.5 hours at 50° C.

The obtained catalyst had an Al/Hf mol-ratio of 200, an Hf-concentration of 0.44 wt % and an Al-concentration of 13.2 wt %.

Polymerisation

A 2 dm³ Büchi autoclave reactor was heated to 50° C. and purged first with dry nitrogen and then with ethylene. 440 ml of propane, from which moisture and oxygen had been removed by passing it through catalyst beds containing molecular sieves copper oxide catalyst, was introduced into the reactor. Then about 200 mg of polymerisation catalyst prepared according to the description above was introduced into the reactor. The reaction was started by feeding ethylene and 0.12 g/h of 1-hexene into the reactor. The pressure in the reactor was set to 24.8 bar so that the partial pressure of ethylene was 8 bar. The pressure was maintained constant by feeding ethylene and 1-hexene to compensate for the amounts consumed in polymerisation. No hydrogen was fed. The polymerisation was allowed to proceed for 270 minutes after which the hydrocarbons were vented and the polymer recovered, dried and analysed.

Preparation Example 3

The procedure of Preparation example 2 was repeated except that the conditions were as shown in Table 1.

Preparation Example 4

A 500 dm$^3$ loop reactor was operated at 85° C. temperature and 60 bar pressure. Into the reactor were introduced propane, ethylene, hydrogen and polymerisation catalyst prepared according to the section Activated catalyst system of Preparation Example 2. No comonomer was introduced into the loop reactor. The polymer was continuously recovered, dried and analysed. The data is shown in Table 2.

Preparation Example 5

The procedure of Preparation Example 4 was repeated except that the hydrogen feed rate was changed. The data is shown in Table 2.

TABLE 1

Data of the high molecular weight components

| | Example | | |
|---|---|---|---|
| | 1 | 2 | 3 |
| Catalyst | A | B | B |
| Amount of catalyst, mg | 115 | 220 | 228 |
| Temperature, ° C. | 60 | 80 | 80 |
| Pressure, bar | 24.5 | 38.1 | 34.6 |
| Ethylene partial pressure, bar | 4 | 8 | 4 |
| Comonomer amount, g | 25 | 26 | 32 |
| $C_6/C_2$, mol/kmol | 30 | 30 | 40 |
| $MFR_2$, g/10 min | | | |
| $MFR_{21}$, g/10 min | 2.5 | 1.2 | 1.0 |
| Density, kg/m$^3$ | 918.2 | 917.7 | 910.2 |
| Mw, kg/mol | 217 | 258 | 265 |
| Mw/Mn | 2.5 | 2.2 | 2.1 |
| Comonomer content, wt-% | 5.4 | 4.2 | 6.8 |

TABLE 2

Data of the low molecular weight components

| | Example | |
|---|---|---|
| | 4 | 5 |
| Catalyst | B | B |
| Temperature, ° C. | 80 | 80 |
| Pressure, bar | 60 | 60 |
| Ethylene concentration, mol-% | 10 | 10 |
| $C_4/C_2$, mol/kmol | 0 | 0 |
| $MFR_2$, g/10 min | 556 | 164 |
| Density, kg/m$^3$ | 973 | 971.5 |
| Mw, kg/mol | 22.2 | 31.5 |
| Mw/Mn | 4.0 | 5.2 |

Example 1

152.4 grams of the polymer of Preparation Example 3 was mixed with 147.6 grams of the polymer of Preparation Example 5 together with 0.6 grams of Irganox B-225 and 0.6 grams of Ca-stearate in a Brabender 350 E mixer with a Roller element at 190° C. temperature for 6 minutes. The screw speed was 40 RPM. The properties of the resulting blend are shown in Table 3.

Example 2

179 grams of the polymer of Preparation Example 2 was mixed with 100 grams of the polymer of Preparation Example 5 and 20 grams of the polymer of Preparation Example 4 together with 0.6 grams of Irganox B-225 and 0.6 grams of Ca-stearate in a Brabender 350 E mixer with a Roller element at 190° C. temperature for 6 minutes. The screw speed was 40 RPM. The properties of the resulting blend are shown in Table 3.

Example 3

180 grams of the polymer of Preparation Example 1 was mixed with 120 grams of the polymer of Preparation Example 4 together with 0.6 grams of Irganox B-225 and 0.6 grams of Ca-stearate in a Brabender 350 E mixer with a Roller element at 190° C. temperature for 6 minutes. The screw speed was 40 RPM. The properties of the resulting blend are shown in Table 3.

Comparative Example 1

Into a 50 dm$^3$ loop reactor operated at 40° C. temperature and 63 bar pressure were introduced ethylene (1.2 kg/h), propane diluent, hydrogen and a polymerisation catalyst. The solid catalyst component was a commercially available product produced and sold by Engelhard Corporation in Pasadena, USA under a trade name of Lynx 200 (now supplied by BASF). The solid component was used together with triethylaluminium cocatalyst so that the molar ratio of Al/Ti was from 30 to 100. The resulting ethylene homopolymer had an $MFR_5$ of 3.5 g/10 min.

The slurry from the loop reactor was introduced into the second loop reactor having 500 dm$^3$ volume operated at 95° C. and 57 bar where additional ethylene, propane and hydrogen were introduced. The resulting ethylene homopolymer had an $MFR_2$ of 300 g/10 min. The slurry was withdrawn into a flash vessel from where the polymer was directed into a gas phase reactor operated at 85° C. and 20 bar where additional ethylene, 1-butene comonomer and hydrogen were introduced. The final polymer was mixed with the additives and extruded. The polymer had $MFR_5$ of 0.29 g/10 min, $MFR_{21}$ of 9.9 g/10 min and a density of 948 kg/m$^3$. The production split (prepolymerised/loop/gas phase) was 1/50/49.

Comparative Example 2

Into a 50 dm$^3$ loop reactor 32 kg/h propane and 8.3 g/h hydrogen and ethylene were added. The operating temperature was 60° C. and the operating pressure was 61 bar. The slurry was taken out of the reactor and transferred into a 500 dm$^3$ loop reactor. The reactor was operated at 85° C. and 58 bar pressure. The single site catalyst prepared as disclosed in EP 1 462 464 was continuously fed at a rate of 29 g/min into the loop reactor. Additional ethylene, 1-butene, propane diluent and hydrogen were continuously introduced into the reactor so that the rate of polymer production was 35 kg/h and the MFR$_2$ of the polymer was 110 g/10 min and the density of polymer was 939 kg/m$^3$.

The slurry was continuously withdrawn from the reactor to a flash stage where hydrocarbons were removed from the polymer. The polymer was then transferred into a gas phase reactor where the polymerisation was continued. The reactor was operated at 80° C. temperature and 20 bar pressure. Ethylene, hydrogen and 1-hexene were fed into the reactor to obtain such conditions that the rate of polymer production was 34 kg/h. The productivity of the catalyst was 2.4 kg/g catalyst.

The ratio between polymer amounts produced in the slurry (reactor 2) and gas phase (reactor 3) reactors was 51/49.

The polymer was then compounded in with 1500 ppm Calcium stearate and 3000 ppm Irganox B225. The final compound had a density of 937 kg/ma.

Data of the resin is given in Table 3.

TABLE 3

Properties of the bimodal blends

| | Example | | | | |
|---|---|---|---|---|---|
| | 1 | 2 | 3 | CE1 | CE2 |
| Split, LMW/HMW | 49/51 | 40/60 | 40/60 | 40/60 | 51/49 |
| MFR$_2$, g/10 min | 0.44 | 0.31 | 0.54 | | 0.45 |
| MFR$_5$, g/10 min | 1.26 | 0.84 | 1.62 | 0.29 | 1.4 |
| MFR$_{21}$, g/10 min | 18.3 | 8.8 | 21.9 | 9.9 | |
| Density, kg/m$^3$ | 940.4 | 939.4 | 940.1 | 948 | 937.2 |
| η$_{2.7}$, kPa | 23950 | 31250 | 20150 | 296000 | |
| SHI$_{2.7/210}$ | 8.1 | 5.4 | 8.0 | 98 | 8.6 |
| Mw, kg/mol | 150 | 166 | 138 | 315 | 157 |
| Mn, kg/mol | 12.0 | 14 | 11.5 | 7.7 | 17.2 |
| Mw/Mn | 13 | 12 | 12 | 41 | 9 |
| Charpy (0° C.), kJ/m$^2$ | 69 | 49 | 42 | 16 | 10 |
| CTL (5 MPa, 60° C.), h | >1200 | >1200 | >1200 | >5000 | N.D |

The invention claimed is:

1. A polymer composition comprising a multimodal copolymer of ethylene and one or more alpha-olefins having front 4 to 10 carbon atoms wherein the multimodal ethylene copolymer has a density of from 937 to 950 kg/m$^3$; a melt index MFR$_5$ of from 0.3 to 3.0 g/10 min; a melt index MFR$_2$ of from 0.1 to 2.0 g/10 min; an MFR$_{21}$/MFR$_5$ ratio which is less than 15; shear thinning index SHI$_{2.7/210}$ of from 2 to 30; and a Mw/Mn of 8-20.

2. The polymer composition according to claim 1 having a melt index MFR$_5$ of from 0.5 to 2.0 g/10 min.

3. The polymer composition according to claim 1 wherein the multimodal ethylene copolymer has an SHI$_{2.7/210}$ of from 3 to 20.

4. The polymer composition according to claim 1 wherein the multimodal copolymer comprises:
(A) from 30 to 70% by weight, based on the combined amount of components (A) and (B), of a low molecular weight ethylene polymer selected from ethylene homopolymer and a copolymer of ethylene and one or more alpha-olefins having from 4 to 10 carbon atoms and having a weight average molecular weight of from 5000 to 100000 g/mol and a density of from 960 to 977 kg/m$^3$; and (B) from 30 to 70% by weight, based on the combined amount of components (A) and (B), of a high molecular weight copolymer of ethylene and one or more alpha-olefins having from 4 to 10 carbon atoms and having a weight average molecular weight of from 100000 to 1000000 g/mol and a density of from 890 to 929 kg/m$^3$.

5. The polymer composition according to claim 4, wherein the low molecular weight ethylene polymer (A) is an ethylene homopolymer and the high molecular weight ethylene copolymer (B) has a density of from 900 to 925 kg/m$^3$.

6. The polymer composition according to claim 4 wherein the high molecular weight copolymer (B) is a copolymer of ethylene and one or more alpha-olefins having from 6 to 8 carbon atoms.

7. The polymer composition according to claim 1 wherein the high molecular weight copolymer of ethylene and the low molecular weight ethylene homo- or copolymer are obtainable by polymerising ethylene in the presence of a metallocene catalyst and an activator for the metallocene catalyst.

8. The polymer composition according to claim 1 wherein the polymer composition has a Chappy impact strength, measured at 0° C. according to ISO 179-1:2000 on V-notched samples according to conditions 1 eA from compression moulded test specimens of type B as defined in ISO 3167 with a thickness of A mm, of at least 30 kJ/m$^2$.

9. A process for producing the polymer composition according to claim 4, comprising the steps of:
(i) polymerising, in a first polymerisation step in a first polymerisation zone, in the presence of a single site polymerisation catalyst, ethylene, hydrogen and optionally one or more alpha-olefins having 4 to 10 carbon atoms to form the low molecular weight component (A) having a weight average molecular weight of from 5000 to 100000 g/mol and a density of from 960 to 977 kg/m$^3$;
(ii) polymerising, in a second polymerisation step in a second polymerisation zone, in the presence of a single site polymerisation catalyst, ethylene, one or more alpha-olefins having 4 to 10 carbon atoms and optionally hydrogen to form the high molecular weight component (B) having a weight average molecular weight of from 100000 to 1000000 g/mol and a density of from 890 to 929 kg/m$^3$;
wherein the first polymerisation step and the second polymerisation step may be conducted in any order and the subsequent step is conducted in the presence of the polymer produced in the prior step and the components (A) and (B) are present in the amounts of 30 to 70% and 70 to 30%, respectively, based on the combined amounts of components (A) and (B).

10. The process according to claim 9 wherein said catalyst is a single site catalyst comprising a metallocene compound and an activator compound.

11. The process according to claim 10 wherein the activator compound is an alumoxane.

12. The process according to claim 10 wherein the metallocene compound is selected from the group consisting of [ethylenebis(3,7-di(tri-isopropylsiloxy)inden-1-yl)]zirconium dichloride, [ethylenebis(4,7-di(tri-isopropylsiloxy)iden-1-yl)]zirconium dichloride, [ethylenebis(5-tert-butyldimethylsiloxy)inden-1-yl)]zirconium dichloride, bis(5-tert-butyldimethyfsiloxy)inden-1-yl)zirconium dichloride, [dimethylsilylenenebis(5-tert-butyldimethylsiloxy)inden-1-yl)]zirconium dichloride, (N-tert-butylamido)(dimethyl)(η$^5$-inden-4-yloxy)silanetitanium dichloride, [ethylenebis(2-(tert-butydimethylsiloxy)inden-1-yl)]zirconium dichloride, bis(n-butylcyclopentadienyl)hafnium dichloride, bis(n-butylcyclopentadienyl) hafnium dibenzyl, dimethylsilylenenebis(n-butylcyclopentadienyl) hafnium dichloride, bis[1,2,4-tri(ethyl)cyclopentadienyl]hafnium dichloride, bis(4,5,6,7-tetrahydroindenyl)zirconium dichloride, bis(4,5,6,7-tetrahydroindenyl)hafnium dichloride, ethylenebis(4,5,6,7-tetrahydroindenyl)zirconium dichloride and dimethylsilylenebis(4,5,6,7-tetrahydroindenyl)zirconium dichloride.

13. The process according to claim 9 wherein in step (i) ethylene is homopolymerized and in step (ii) ethylene is copolymerised with at least one alpha-olefin comonomer having from 6 to 8 carbon atoms.

14. A pipe comprising the composition according to claim 1.

15. The polymer composition according to claim 5 wherein the high molecular weight copolymer (B) is a copolymer of ethylene and one or more alpha-olefins having from 6 to 8 carbon atoms.

\* \* \* \* \*